United States Patent [19]

Iwanciow et al.

[11] 3,830,057
[45] Aug. 20, 1974

[54] PROPULSION METHOD USING HYPERGOLIC SOLIDS

[75] Inventors: Bernard L. Iwanciow; Richard O. MacLaren, both of Sunnyvale, Calif.

[73] Assignee: United Aircraft Corporation, East Hartford, Conn.

[22] Filed: Nov. 29, 1963

[21] Appl. No.: 328,156

[52] U.S. Cl. ............ 60/219, 149/2, 149/19, 149/20, 149/87
[51] Int. Cl. ............ C06d 5/06
[58] Field of Search ............ 60/35.4; 149/2, 19, 20, 149/87

[56] References Cited
UNITED STATES PATENTS

| | | | |
|---|---|---|---|
| 3,097,119 | 7/1963 | Tyson | 60/35.5 |
| 3,103,782 | 9/1963 | Olah et al. | 60/35.4 |
| 3,116,599 | 1/1964 | Campbell | 60/35.6 |
| 3,132,475 | 5/1964 | Hopper | 60/35.6 |
| 3,141,295 | 7/1964 | Olah | 60/35.4 |

OTHER PUBLICATIONS

Gall, ARS, Journal, Vol. 29, No. 2, Feb. 1959, pp. 97 and 98.

*Primary Examiner*—Benjamin R. Padgett
*Attorney, Agent, or Firm*—Steven F. Stone

EXEMPLARY CLAIM

A method for controllably producing high temperature effluent comprising controllably contacting a solid fuel grain comprised of active alkali metal hydrides and their derivatives and a solid oxidizer grain comprised substantially of interhalogen alkali metal fluoride complexes, whereby said fuel and said oxidizer react hypergolically to produce heat, light and gas.

5 Claims, 1 Drawing Figure

PATENTED AUG 20 1974  3,830,057
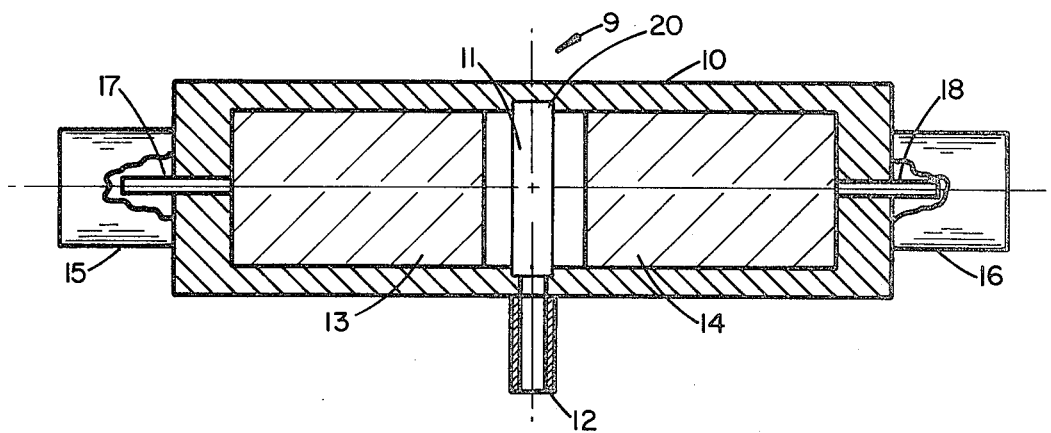

PROPULSION METHOD USING HYPERGOLIC SOLIDS

The present invention relates to solid phase materials which, upon contact, will ignite spontaneously producing high temperature gases and more particularly to reignitable solid propellant grains.

It is well-known in the rocket propulsion industry that systems employing solid motors would have considerably wider application if they enjoyed the thrust termination and restart characteristics of liquid motors. In the past, a number of attempts have been made to provide solid engines with start-stop capabilities. For example, it has been proposed to place large valves in the motor casing opening to the combustion zone of the motor so that the combustion pressure could be dropped to ambient, thereby extinguishing the flame. To restart, the valve is then closed and an igniter is fired to reignite the grain. However, this, as other similarly proposed systems, calls for additional hardware decreasing the effective payload of the system. Another approach to the problem calls for a plurality of separate propellant charges which are fired individually at timed intervals; but, this lacks adequate control flexibility as an entire charge must be fired, which may not always impart the exact degree of thrust desired.

The present invention overcomes the aforementioned difficulties by employing a system which is a substantial breakthrough in the art, namely, the development of spontaneously ignitable solids suitable for use as propellant grains. Briefly stated, the invention herein provides for a pair of solid phase substances of opposite chemical characteristics which, upon contact, ignite hypergolicly and, upon withdrawal, cease combustion until recontacted. Moreover, by adjusting the relative positions of the solids during combustion, the combustion can be controlled to afford a controlled rate of burning. Although the unique materials of the present invention may be used for propulsion systems, they may also be used for numerous purposes where a source of heat, light and/or gases is desired. For example, they may be used in lieu of carbon electrodes and an electric power source for generation of intense light for search lights, light house beacons or motion picture projectors.

It is an object, therefore, of the present invention to provide solid materials which ignite by physical contact.

It is a further object to provide solid materials which can be ignited, extinguished and reignited at will.

It is a still further object to provide solid materials which can be caused to react at a controlled rate by simply adjusted the relative positions of the materials to one another.

It is yet another object to provide a unique method for producing at will light, heat and high temperature gases.

Other features and advantages will be apparent from the specification and claims, and from the accompanying drawing which illustrates a suitable application of the materials of the present invention.

In FIG. 1, there is shown in longitudinal section a light, heat and gas generating device employing the spontaneously ignitable solids of the present invention. The generator 9 is comprised of a housing 10, a discharge port 12 and contains a cavity 11 lodging two spontaneously ignitable solids of the present invention 13 and 14. To bring these solid phases 13 and 14 into contact, drive means 15 and 16 acting through push rods 17 and 18, respectively, move the grains 13 and 14 forward and backwards along the axis of the cavity 11.

When the solid phases 13 and 14 are brought into contact, they ignite spontaneously producing intense light, heat and high temperature gases which collect in annular recess 20 and discharge out of port 12. For use as a light generator, the light emitted from port 12 may be manipulated by appropriate lenses, mirrors and other optical devices, as required for the specific application at hand. In the event the generator is used for heating, the hot gases emitted from port 12 may be circulated through appropriate heat exchangers not shown but well known in the art. Also, the generator may be employed to do work by causing the hot gases emerging from port 12 to vent into a thermodynamic engine similar to a reciprocating steam engine or a flow machine such as a turbine; devices, not shown, but again, well-known in the art. In addition, the device of FIG. 1 can be used as a rocket propulsion unit since the force of the gases flowing out of port 12 sets up an equal and opposite force in the generator 9 propelling it in a direction opposite from the direction of the emerging gases.

It has been found that suitable materials for the fuel half of the pair of solid hypergols are active metal hydrides such as lithium aluminum hydride. Suitable oxidizers have been found to be interhalogen alkali metal fluorides such as cesium tetrafluorochlorate. A series of suitable reactive pairs are described in more detail in the following examples.

EXAMPLE 1

A suitable reactive pair was found to be lithium aluminum hydride, $LiAlH_4$ and cesium tetrafluorochlorate $CsClF_4$.

Lithium aluminum hydride is an item of commerce frequently used in organic chemical reductions. It is a normally obtained as a stable white solid in powdered form in sealed containers such as glass bottles or metal cans to protect it from atmospheric moisture.

To produce cesium tetrafluorochlorate possessing desirable properties for ignition on contact with $LiAlH_4$, it was necessary to use dry powdered cesium fluoride heated to 100°C. Dry gaseous chlorine trifluoride was passed over the heated solid for a period of 1 hour. Solid cesium tetrafluorochlorate, a delicate pink solid, is the only product formed in this reaction, therefore, after cooling to room temperature, no further purification is necessary.

These two powdered compounds, lithium aluminum hydride and cesium tetrafluorochlorate were placed in a dry nitrogen filled cabinet. A small quantity of the lithium aluminum hydride (approximately two grams) was placed upon a glass plate. A similar quantity of the cesium tetrafluorochlorate powder was sprinkled onto the hydride. A vigorous combustion which consumed the two materials occurred as soon as the materials came into contact with each other.

EXAMPLE 2

Lithium aluminum hydride and potassium chlorotetrafluorate $KClF_4$ were likewise discovered to be hypergolic.

Potassium tetrafluorochlorate was formulated in a manner similar to that described for the cesium tetrafluorochlorate in Example 1, except that potassium fluoride was substituted for cesium fluoride in the preparation of the final oxidizer material.

The two materials were established to be hypergolic by combining the powders by the process described in Example 1.

EXAMPLE 3

The two powders LiAlH$_4$ and CsClF$_4$ were prepared in a more readily manipulated form by separate high pressure molding operations. The pressing operation was performed in a dry nitrogen atmosphere. Each material in powdered form was separately placed into the cavity of a cylindrical compression mold approximately 3/8 inch in diameter. A hydraulic pressure of 5,000 psi was exerted on the ram of the mold to compact the powders into cylindrical shaped grains of each material.

The finished grains were affixed to a mechanism which was arranged so that the grains could be brought into contact and could be separated at will. The cesium tetrafluorochlorate grain was then pressed against the lithium aluminum hydride grain whereupon instantaneous ignition resulted. Withdrawal of the cesium tetrafluorochlorate stopped the combustion process and subsequent recontact caused the vigorous reaction to start again. The two grains were repeatedly brought in and out of contact causing on-off combustion until entirely consumed.

EXAMPLE 4

It was found that nitronium perchlorate, NO$_2$ClO$_4$, reacted when contacted with the lithium aluminum hydride described above.

The solid oxidizer, nitronium perchlorate, is available as an item of commerce in powder form and was pressed into a suitable grain form in the manner described in Example 3.

These materials were brought into contact resulting in immediate ignition. Again stop-restart operation was effected by bringing the materials in and out of contact.

EXAMPLE 5

A special fuel grain was produced comprised of 50 percent by weight of a mixture of equal parts of lithium and lithium hydride in fine comminuted form homogeneously distributed in a matrix of polybutadiene. This cast fuel grain was found to be hypergolic with the nitronium perchlorate, cesium tetrafluorochlorate and potassium tetrafluorochlorate grains described above. The method for producing this grain is described in detail in Example 1 of copending patent application Ser. No. 270,322 by Peter L. Stang filed on Apr. 3, 1963.

The fuel reacted vigorously upon contact with all the aforementioned oxidizers.

EXAMPLE 6

To demonstrate the application of this invention in a useful gas generator configuration, lithium aluminum hydride was brought into contact with cesium tetrachlorofluorate in a device containing the features illustrated in FIG. 1. Again, upon contact ignition resulted, producing intense heat and light along with hot combustion products which generated a pressure measured by a Bourdon type pressure gauge attached to the combustion chamber. Hot combustion products issued from the exhaust port of the gas generator at a high velocity, thereby imparting thrust to the system.

It is apparent from the above examples that a number of variations, mixtures and substitutions will suggest themselves to those skilled in the art. It will be obvious, therefore, for those skilled in the art that the present invention is not limited by the above described examples, but it is susceptible of various modifications and changes without departing from the spirit thereof.

We claim:

1. A method for controllably producing high temperature effluent comprising controllably contacting a solid fuel grain comprised of active alkali metal hydrides and their derivatives and a solid oxidizer grain comprised substantially of interhalogen alkali metal fluoride complexes, whereby said fuel and said oxidizer react hypergolically to produce heat, light and gas.

2. A method for producing a controlled exothermic reaction comprising:
    a. providing an enclosure with at least one opening;
    b. placing a first body comprised of a solid fuel inside said enclosure;
    c. placing a second body comprised of a solid oxidizer which is hypergolic to said solid fuel inside of said enclosure at a first predetermined distance from said first body;
    d. contacting said first and second bodies to initiate a reaction between said bodies to produce a hot, gaseous effluent;
    e. selectively moving at least one of said first and second bodies so as to control the distance between said first and second bodies and, therefore, the rate of reaction between them; and
    f. exhausting said hot, gaseous effluent through at least one of the openings in said enclosure.

3. A method as in claim 2 wherein the solid fuel is comprised substantially of active alkali metal hydrides and their derivatives and the solid oxidizer is comprised substantially of interhalogen alkali metal fluoride complexes.

4. A method of producing a controlled exothermic reaction within a combustion chamber comprising:
    a. locating a solid fuel element within said combustion chamber;
    b. locating a solid oxidizer element within said combustion chamber and physically separated from said solid fuel element, said solid fuel element and said solid oxidizer elment being hypergolic with respect to each other;
    c. controllably contacting said fuel and oxidizer elements whereby combustion of said elements is initiated.

5. The process of claim 4 further comprising the steps of controllably varying the distance between said fuel and oxidizer elements after combustion is initiated whereby the rate of combustion is controllably varied.

* * * * *